United States Patent [19]
Izumitani et al.

[11] Patent Number: 5,617,640
[45] Date of Patent: Apr. 8, 1997

[54] LEVEL POSITION MEASURING METHOD, LEVEL MARKING METHOD AND LEVEL MARKING APPARATUS COMPRISING A TUBE, CAPABLE OF DIRECTLY MEASURING A HEIGHT

[75] Inventors: Takeshi Izumitani, 1-3-3-1410, Seishin-cho, Edogawa-ku, Tokyo; Katsushi Kobayashi, Saitama, both of Japan

[73] Assignees: Takeshi Izumitani; Shinwa Co., Ltd., both of Tokyo, Japan

[21] Appl. No.: 361,491

[22] Filed: Dec. 22, 1994

[30] Foreign Application Priority Data

Dec. 27, 1993 [JP] Japan .................................. 5-332279

[51] Int. Cl.$^6$ ............................................. G01C 5/04
[52] U.S. Cl. ..................................................... 33/367
[58] Field of Search ........................................ 33/367

[56] References Cited

U.S. PATENT DOCUMENTS

| | | | |
|---|---|---|---|
| 2,557,021 | 6/1951 | Williams | 33/367 |
| 2,587,998 | 3/1952 | Heath | 33/367 |
| 2,641,061 | 6/1953 | Schmidt | 33/367 |
| 3,118,088 | 1/1964 | Hanson | 33/367 |
| 3,212,195 | 10/1965 | Paarma et al. | 33/367 |
| 3,949,484 | 4/1976 | Cluley et al. | 33/367 |
| 4,231,163 | 11/1980 | Turloff . | |
| 4,356,639 | 11/1982 | Opazo | 33/367 |
| 4,434,561 | 3/1984 | Gaspar . | |
| 4,536,968 | 8/1985 | Lopiccolo . | |
| 4,563,822 | 1/1986 | Legris | 333/367 |
| 4,669,484 | 6/1987 | Masters . | |
| 5,001,926 | 3/1991 | Delignieres . | |
| 5,367,782 | 11/1994 | Izumitani . | |

FOREIGN PATENT DOCUMENTS

| | | | |
|---|---|---|---|
| 553871 | 8/1993 | European Pat. Off. | 33/367 |
| 69509 | 4/1985 | Japan | 33/367 |
| 1530895 | 12/1989 | U.S.S.R. | 33/367 |

OTHER PUBLICATIONS

"Koredakewa Shitte Okitai Kenchiku Kohiji No Sumidashi No Jitsumu"; by Hisao Hamamatshu & Tatsuo Naito; first published Jun. 5, 1981 (English Translation provided).

*Primary Examiner*—Thomas B. Will
*Attorney, Agent, or Firm*—Banner & Witcoff, Ltd.

[57] ABSTRACT

A level marking apparatus capable of directly measuring height comprises an elastic synthetic resin tube. One end of the tube is secured to a pressure sensor capable of producing an output voltage and air-tightly sealed, and the other end of the tube is connected to a reference instrument, which has a larger diameter and is shorter in length than the tube. The tube is totally filled with low viscosity macromolecule liquid. Moreover, the pressure sensor is connected to a micro computer programmed to find an average value of fluctuation waveform within a certain cycle of output voltage of the pressure sensor. The micro computer also calculates and memorizes a reference level based on a pressure difference between the reference instrument and the pressure sensor when placed at different heights. Additionally, a marking device is connected to the pressure sensor, and it is actuated by an ON signal from the pressure sensor. The ON signal is dispatched when the marking device is at the same height as the reference level. The marking device and the pressure sensor are secured to a lift, capable of moving up and down along a staff plate. The marking device automatically indicates a level mark when a level is reached equal to the reference level.

5 Claims, 8 Drawing Sheets

calculated height(h)

marking position optical-type (eyesight)

FIG. 11(b)

calculated height(h)

marking position laser beam-type (eyesight)

LEVEL POSITION MEASURING METHOD, LEVEL MARKING METHOD AND LEVEL MARKING APPARATUS COMPRISING A TUBE, CAPABLE OF DIRECTLY MEASURING A HEIGHT

BACKGROUND OF THE INVENTION

The present invention relates to a level position measuring method, level marking method and level marking apparatus comprising a tube, capable of directly measuring a height.

Up to now, the basic of level marking in constructions is such that the level marking begins with marking a horizontal line mark as a primary mark (a parent mark) on a surface of a builiding frame and a pillar of a building. Level positions of a ceiling, floor, sashes and fittings are figured by marks measured based on the horizontal line mark. Such marks are so-called a child mark (secondary line mark).

As a prior art, there is a level measuring apparatus in combination of a staff having a scale on the surface thereof and a optical-type level which reads the scale of the staff. The disadvantage of this optical-type apparatus is that the scale of the staff is often misread. According to this prior art, a staff is placed in a certain position and the scale thereof is read from both the front and back sides by the optical-type level. Then a certain height calculated beforehand is added thereto and marking is done manually. This process has to be repeatedly done. Another disadvantage of this prior art is that it requires an assistant besides an operator. Further, it also requires a good skilled and well experienced operator to complete the level marking successfully.

Concering these disadvantages, there is a laser-beam-type level which releases a laser beam to a staff. The disadvantage of this laser-beam-type level is that a spot of the laser-beam on the scale of the staff is rather large, so that it lacks accuracy of measurement.

A mutual disadvantage of both the optical-type and the laser-type levels is that actual marking process is done by human hands. Thus it also lacks accuracy of level measurement. Another mutual disadvantage is that the measurement can only be performed at an open space in which there is no obstacle between the level and the staff, which disturbs a pass way of the light and the laser beam. In case there is any obstacle, it should be removed or the level or the staff should be replaced.

Figure 9:
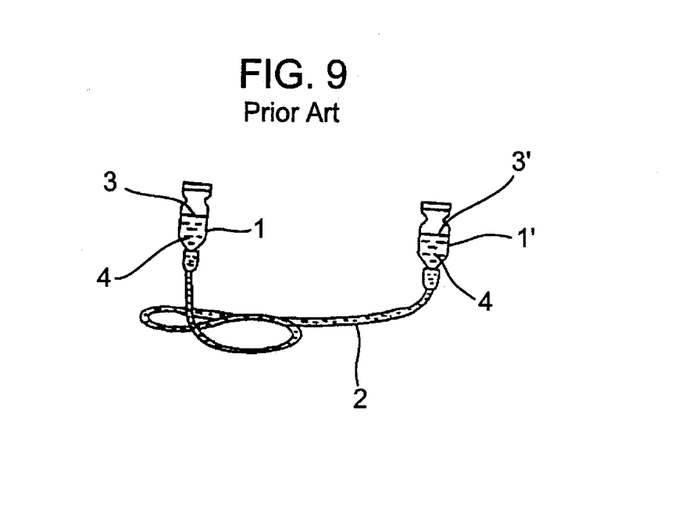
FIG. 9 shows an elevational view of a leveling tube according to a prior art.

A leveling tube, another prior art, is used at a place such as a small room in which a level cannot be used and leveling accuracy is not highly required. A leveling tube is widely used because it is inexpensive compared to an apparatus such as a laser-type level, and it is easy to use for any workers. A leveling tube is shown in FIG. 9. The leveling tube comprises a pair of transparent pipes 1, 1' connected to each other by a rubber hose 2, and it is arranged such that the water level 3, 3' of the water 4 filled in the pipes 1, 1' is observable from outside.

The principle of the leveling tube is that the water level 3 in the tube 1 is equal to the other water level 3' in the tube 1', so that when the water level 3 is adjusted to the reference level, the other water level 3' indicates the same level.

The leveling tube is inexpensive compared to a optical-type level and a laser-type level, and it can be used in places that a optical-type or a laser-type level cannot be used because obstacles such as walles disturb a runway of the light or laser beam, so long as the rubber tube 2 reaches. The disadvantage of the leveling tube is that the water 4 in the tube spills since both edges of the hose are not sealed.

Another disadvantage thereof is that it takes some time for the water level is stabilize.

Figure 10:
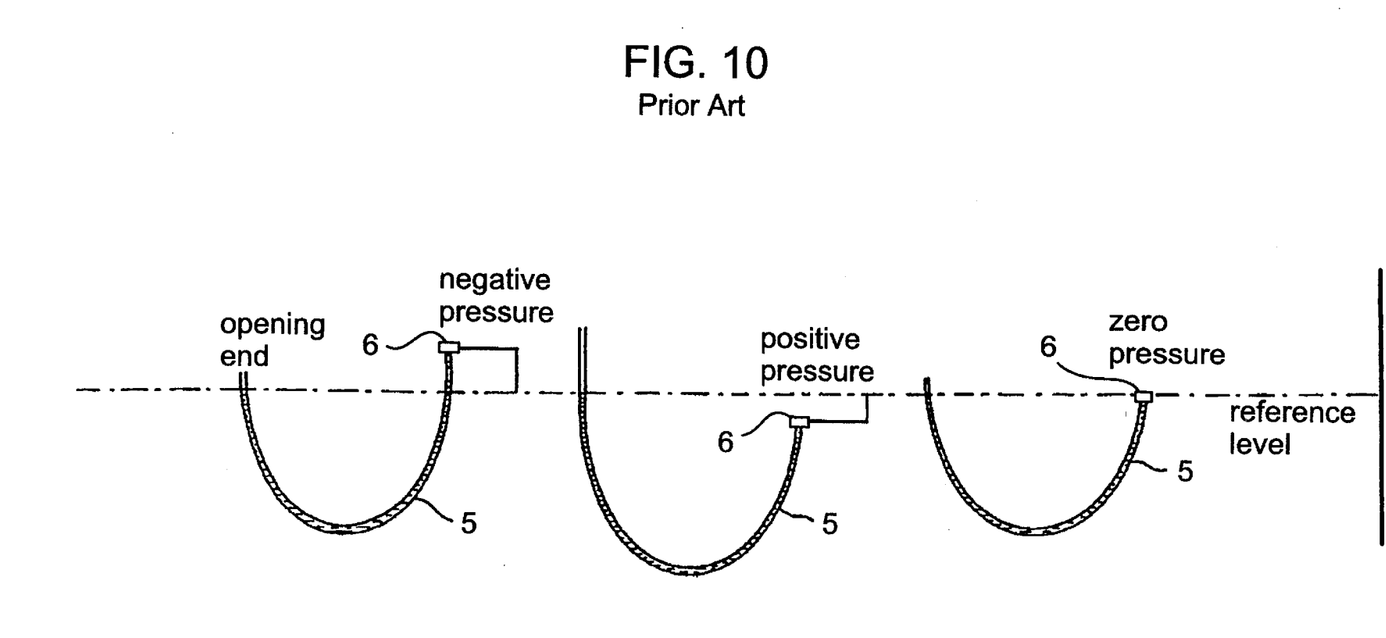

The applicant of the present invention filed an patent application (Japanese patent application No. 4-38752) for an invention which resolved the spilling problem and stabilizing problem of the leveling tube. The invention is such, as shown in FIG. 10, that one end of the tube 5 is airtightly closed, so that the water does not spill even from the other end of the tube which is still open to the atmosphere, and that the fluidity of the water in the tube is more stable, enabling the level measurement more accurately.

The structure of this prior invention is such that water is filled in a tube, one end thereof is airtightly closed by securing a pressure sensor thereto and the other end thereof is widely open. A level or any height can be measured as such that the pressure sensor indicates zero when the water level of the closed end comes to the level equal to the level of the open end of the tube, and the pressure sensor indicates positive pressure when the water level of the closed end is lower than that of the open end. In the same manner, the pressure sensor indicates negative pressure when the water level of the closed end is higher than that of the open end of the tube.

Figure 11A:
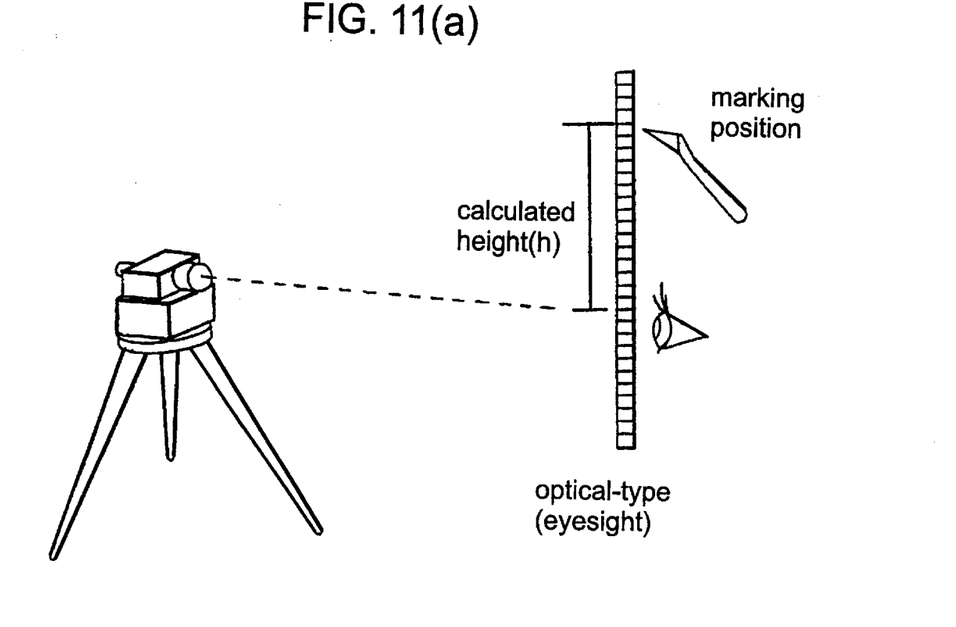
Figure 11B:
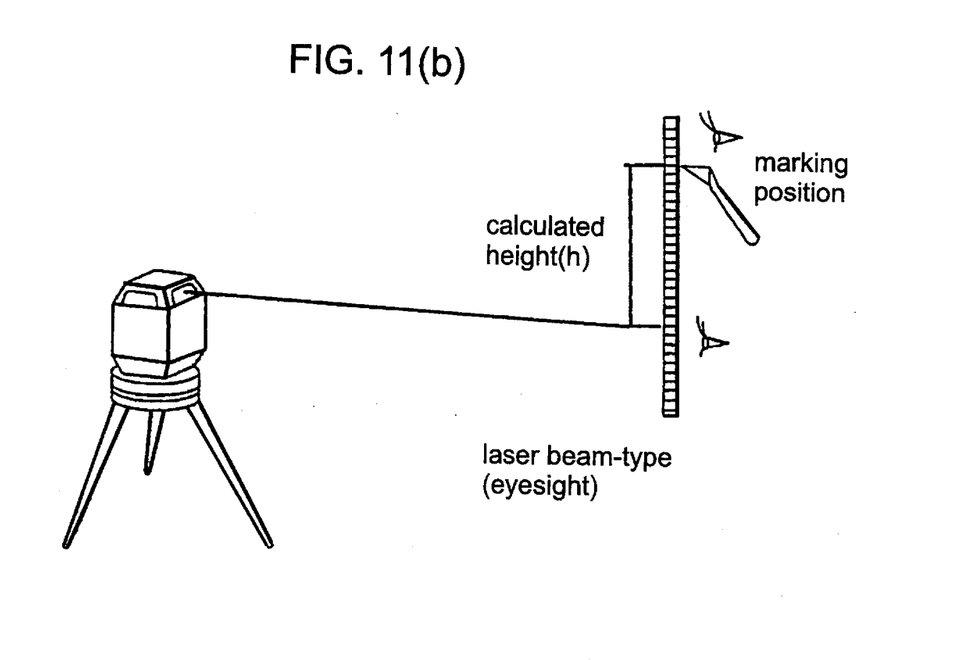

According to the optical-type and laser-type levels, they require to draw secondary line marks based on a horizontal line mark. That is, each level of the prior art can only indicate a level of the apparatus. As shown in FIGS. 11 (a) and (b), when a certain level is to be measured and the level differ from that of the apparatus, the level of the apparatus is measured at first, then a difference (h) between the certain level and the level of the apparatus, which is figured out beforehand, is added using a scale to the level of the apparatus and a marking is done thereto. That is, in most cases, levels cannot be directly measured or marked, instead, drawing a secondary line mark based on the primary line mark is required.

According to the prior art already filed by the applicant of the present invention, a number of technical problems which should be resolved have been found as it was examined at a tough condition of construction field. At a construction field, the apparatus of the prior art is often affected by outer force such as wind, vibration, temperature and accidents, so that the inner pressure of the tube often varies depending on such conditions, which unstabilizes the water level of the open end of the tube and an output of the electric pressure of the pressure sensor, causing the measurement inaccurate.

The object of the present invention, an innovated invention of the applicant, is to provide a level position measuring method, level marking method and level marking apparatus comprising a tube capable of directly measuring a certain height, without being affected by outer causes at construction fields.

BRIEF DESCRIPTION OF THE DRAWINGS

FIGS. 4 (a), (b), (c) show elevational views of a reference instrument at certain positions according to the present invention.

FIG. 10 shows an elevational view of principle a prior art (and the present invention) is based on.

FIGS. 11 (a), (b) show perspective views of secondary marking operations according to the prior arts.

DETAILED DESCRIPTION OF THE PRESENT INVENTION

To achieve the object raised above, a level position measuring method according to the present invention comprises a plastic(synthetic resin)-made tube (hose) with elasticity and softness. One end of the tube is secured to a pressure sensor and airtightly closed, and the other end of the tube is connected to a reference instrument. The reference instrument is larger in diameter and shorter in length compared to the tube. The tube is filled with low viscosity macromolecule liquid such as silicon oil or water. The pressure sensor is connected to a micro computer, which finds an average value of fluctuation waveform within a certain cycle of output voltage of-the pressure sensor. The micro computer also calculates and memorizes a reference level based on the pressure difference caused by the reference instrument and the pressure sensor, which are placed-at different height. The reference level is measured at a desired area applying an theory that the pressure sensor indicates zero at a position equal level to the reference level, positive pressure when the pressure sensor is below the reference level, and negative pressure when above the reference level.

A level marking method comprising a tube, capable of directly measuring a height, comprises a pressure sensor introduced in claim 1 which is connected to a marking means such as a solenoid-type inker, cam-type inker or Jet(spray) printer. The marking means functions as it receives ON and OFF signals from the pressure sensor. The ON signal is dipatched when the marking means such as an inker is even to the reference level, while the OFF signal is dipatched otherwise. The marking means and the pressure sensor are unitedly secured to a lift which is capable of moving up and down along a staff plate. The marking means automatically indicates a level mark when it comes to a level equal to the reference level.

A level marking apparatus comprising a tube, capable of directly measuring a height, comprises a sythtic resin tube with much elasticity and softness. The one end of the hose is secured to a pressure sensor and airtightly closed, and the other end of the hose is connected to a reference instrument. The reference instrument is larger in diameter and shorter in length compared to the hose. The hose is filled with low viscosity macromolecule liquid such as silicon oil or water. The pressure sensor is connected to a micro computer, which computes an avarage value of fluctuation waveform within a certain cycle of output voltage of the pressure sensor. The micro computer also calculates and memorizes a reference level based on the pressure difference caused by the reference instrument and the pressure sensor, which are placed at different height. The pressure sensor is connected to a marking means such as a solenoid-type inker, cam-type inker or jet(spray) printer. The marking means functions as it receives ON and OFF signals from the pressure sensor. The ON signal is dipatched when the marking means such as an inker is even to the reference level, while the OFF signal is dipatched otherwise. The marking means and the pressure sensor are unitedly secured to a lift which is capble of moving up and down along a staff plate. The marking means automatically indicates a level mark when it comes to a level equal to the reference level.

The level marking apparatus comprising a tube, capable of directly measuring a height may further comprise a wave-control top plate and a side plate at an opening of the tube in the reference instrument to cease fluctuation energy.

The level marking apparatus comprising a tube, capable of directly measuring a height may further comprise an outer tube, surrounding an inner tube, to protect the inner tube from an outer cause such as variation of temperature and mechanical shock.

According to a level position measuring method of the present invention, level measurment is done as such that a reference instrument is placed, for example, on a floor, while an automatic marking detector is adjusted and set to a reference level which is scaled in advance based on the bench mark, then, within an area the a tube can reach, level marking equal to the reference level can be automatically done by the detector.

This operation can be done by only a single worker and the marking is done automatically. Further, it does not require to draw secondary line marks as it was required in the prior art. Therefore, according to the present invention, anyone without much experience or skill in the field can do the level marking easily and accurately. The present invention is remarkable compared to the prior art that so long as the tube reaches, level marking can be done at anyplace such as at a corner, behind a wall and a small room where the levels of prior art cannot be positioned.

It should also be remarked, as mentioned above, that an accurate marking process can be easily completed by a single person, and the level marking is directly done which unnecessiates secondary line marks.

According to the prior art, level marking is completed as such that a primary line mark is drawn at first, then a secondary line mark is drawn adding some length to the primary line mark.

According to the present invention, level marking for a ceiling, floor and sash can be done directly, easily and accurately, so that even an inexperienced and non-skilled worker can complete the level marking by himself, and that cost required for the level marking operation can be saved.

For any construction, accuracy in level marking is essential. Usually, the level marking is done as soon as a building flame is completed by field workers and sometimes by specialists. However, the marks are often erased naturally as the construcition proceeds, so that normally level marking is repeatedly done for a few times.

Level marking operations have not always been done accurately in the past, and it is not unusual that level marking is drawn at a position a few milimeter above or below the correct level, so that there have been problems that a sash or floor is not even.

Such problems were arised because level marking required two operations such that first a primary line mark is marked then a secondary line mark is marked based on the primary line mark. Even the newest laser planar cannot resolve such problems, so that means which can be easily operated by workers is desired. The present invention satisfies such desire.

According to the present invention, low viscosity macromolecule liquid or water is filled in a tube, which does not leak through the wall of the tube, so that it is not necessary to refill the liquid(Mater) therein, and that it is easy to maintain the tube.

According to the present invention, an opening end of the tube is arranged with larger diameter and lower height, so that when an outer force is affected to the tube and the inner pressure of the tube fluctuates, the fluctiation energy can be released at once, and that the fluctuation in the tube can be controlled faster.

A pressure sensor according to the present invention is so sensitive that when there is even little fluctuation in the tube, it would take time to indicate the reference value, but since the pressure sensor is connected to a micro computer comprising a software which detects a certain cycle of the fluctuation in the tube and calculates an avarage value thereof, so that even the fluctuation in the tube is still moving, it can indicate a reference value, enabling the level marking operation quicker. Such a care is applied to resolve the problems caused by the condition that it takes time until the fluctuation of the liquid in the tube becomes stable because of the reason that the liquid is macromolecule, and that a long tube has to be placed at a construction field where an outer force often affects to the tube.

In a case that, a wave-control top plate and a side plate are installed in a reference instrument, the fructuation energy in the hose generated by an outer force can more quickly be controlled. Further, in case an outer tube is comprised around an inner tube the liquid is filled therein, the inner tube can better be protected from factors such as heat and mechanical shock.

PREFERRED EMBODIMENT OF THE INVENTION

Figure 1:
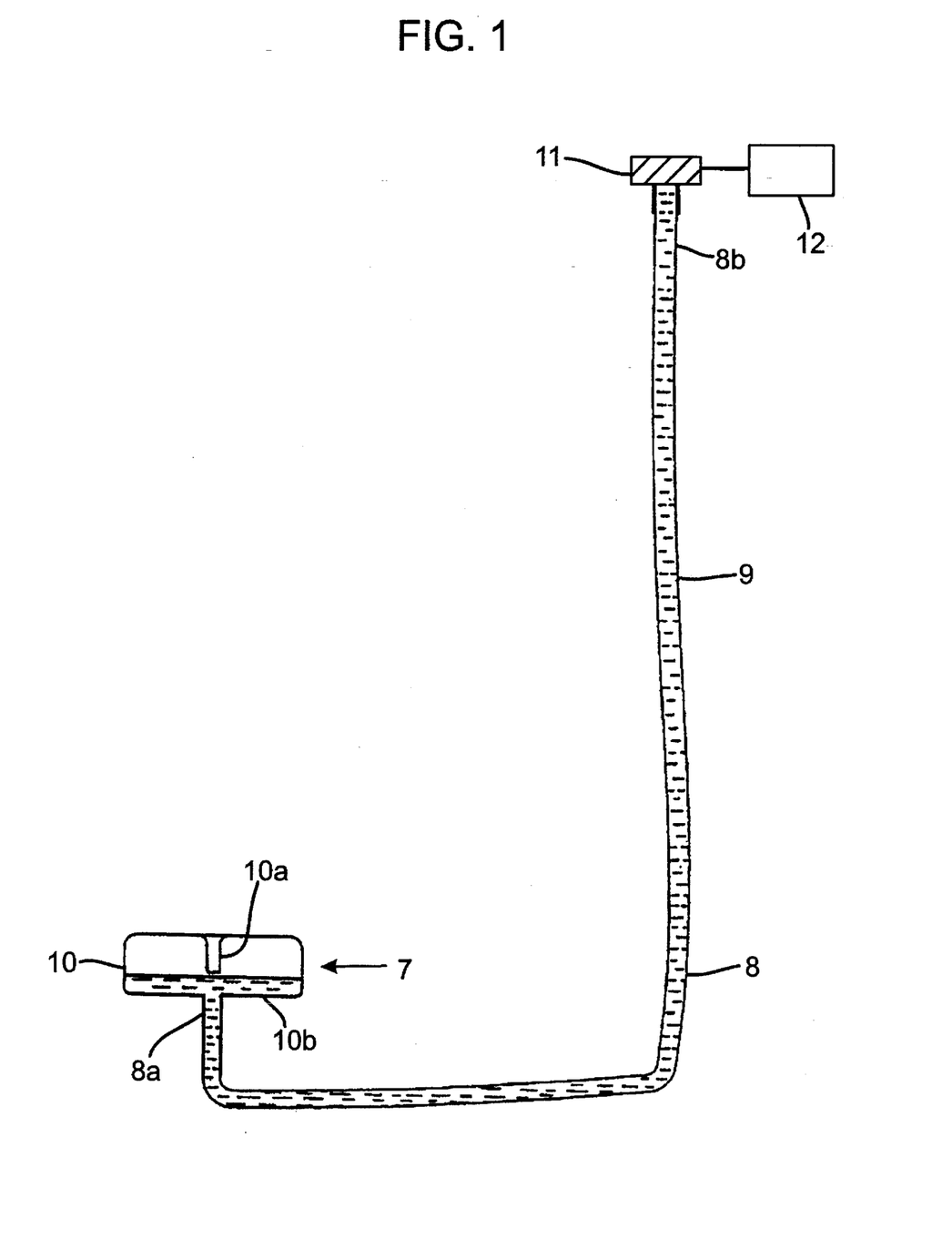
FIG. 1 shows an elevational view of a basic structure of the present invention.

A preferred embodiment of the present invention is shown in FIG. 1. A tube 8, made of synthetic resin such as urethane with enough elasticity and softness, forming a leveling tube, is filled with low viscosity macromolecule liquid 9 such as water or silicon oil. One end 8a of the tube 8 is connected to a bottom wall 10b of a reference instrument 7 which is larger in diameter and shorter in height compared to the tube 8. The reference instrument 7 comprises a box 10 having an air pipe 10a which air passes therethrough at the top wall thereof. The other end 8b of the tube 8 is airtightly sealed as an air sensor 11 is secured thereto. The box 10 is filled with a certain amount of the liquid 9. In case the liquid 9 is low viscosity and there is possibility that the liquid may leak from the box 10, a valve can be installed to the air pipe 10a to prevent the leaking.

Figure 2:
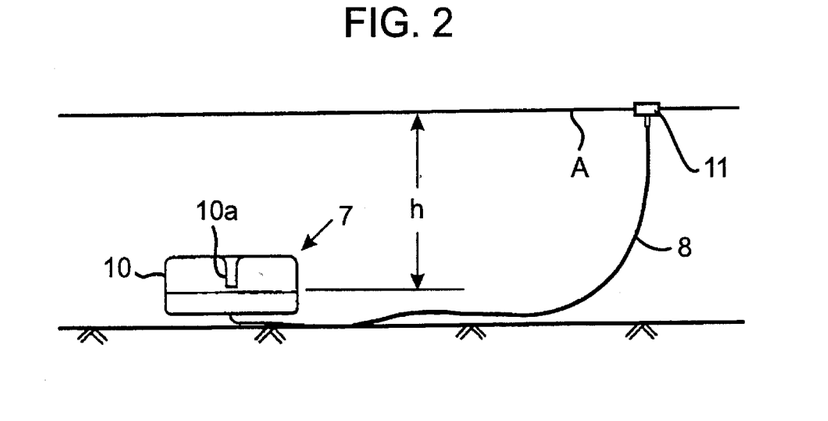
FIG. 2 shows an elevational view of a structure of setting a reference level according to the present invention.

The pressure sensor 11 comprises a micro computer 12 with a software which calculates an average value of fluctuation waveform in a certain cycle of output voltage of the pressure sensor 11. Further, as shown in FIG. 2, the micro computer 12 memorizes a reference value based on the differential pressure caused by the level differences (h) between the reference instrument 7 placed on such as a floor and the pressure sensor 11 situated to the level (A).

Figure 5:
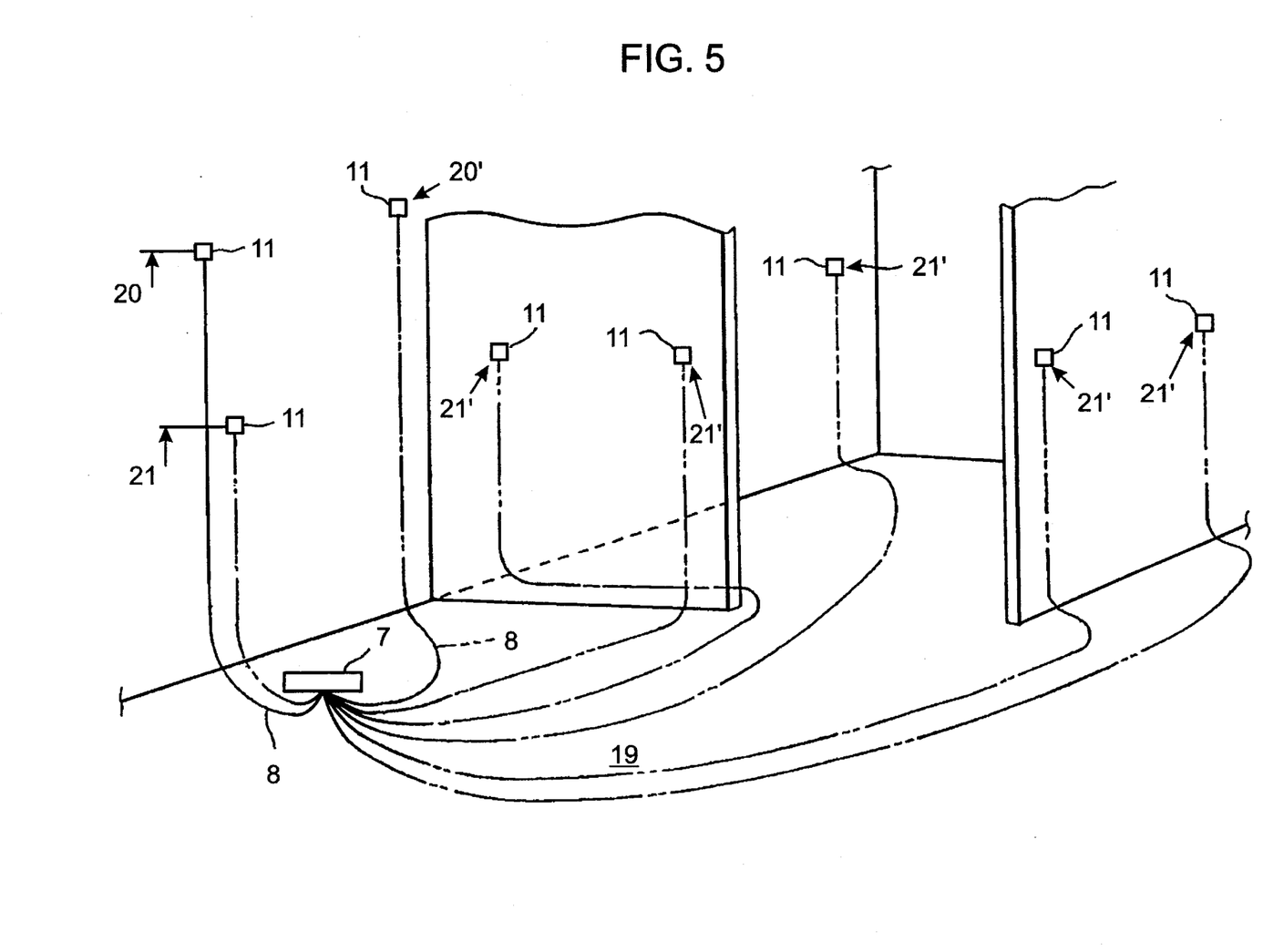
FIG. 5 shows a perspective view of measurement according to the present invention.

As shown in FIG. 5, when a level position of a ceiling 20 or any other part 21 is to be measured, a reference instrument 7 is placed on a floor 19 which is even, and a pressure sensor 11 is positioned before measurement at a certain height which will be the reference level, and the reference level is memorized in a micro computer 12. Once the reference level is memorized in the micro computer 12, level marking for ceiling 20' or any other part 21' as high as the reference level can be done at any place such as behind a wall to the extent that a tube 8 can reach.

The major characteristic of the present invention is that an operation of secondary line marking is not required at both a reference instrument 7 and a pressure sensor 11. As a result of this, mis-measurement caused by a secondary line marking operation is prevented.

Figure 4:
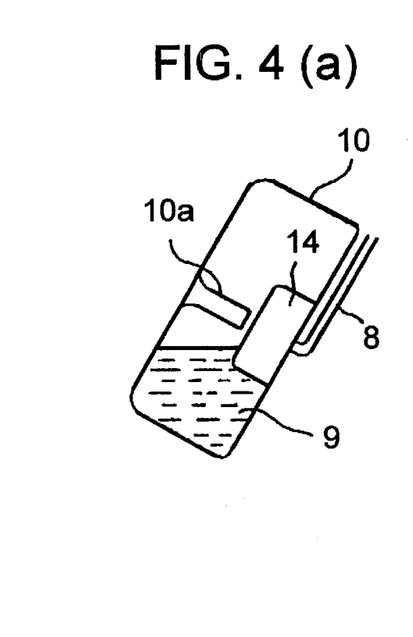

According to the preferred embodiment of the present invention, as described above, the box 10 comprises the air pipe 10a so that one end of the tube 8 is open to the atmosphere, and the other end of the tube 8 is airtightly closed, therefore, the liquid 9 in the tube 8 is prevented from leaking. The liquid 9 does not leak through the wall of the tube 8. Thus, the amount of the liquid 9 in the tube 8 still remains, As shown in FIGS. 4 (a)–(c), the liquid 9 in the box 10 does not leak therefrom even if the box is reversed or forced to stand at irregular positions, so that it is easy to carry or handle the box 10. To keep the liquid 9 in the tube 8 and the box 10 safely is an essential factor for the present invention.

When the present invention is actually used at a construction field, it will deeply be affected by various factors such as vibration, wind, temperature and accidents, so that the liquid 9 in the tube 8 is fluctuated by an outer force, thereby, it is necessary to wait until the fluctuation disppears to pursue an accurate measurement. According to the present invention, the box 10 is larger in diameter and shorter in length compared to the tube 8, so that the fluctuation in the tube 8 quickly disappear to the atmosphere, and that quicker measurment can be accomplished.

Figure 3:
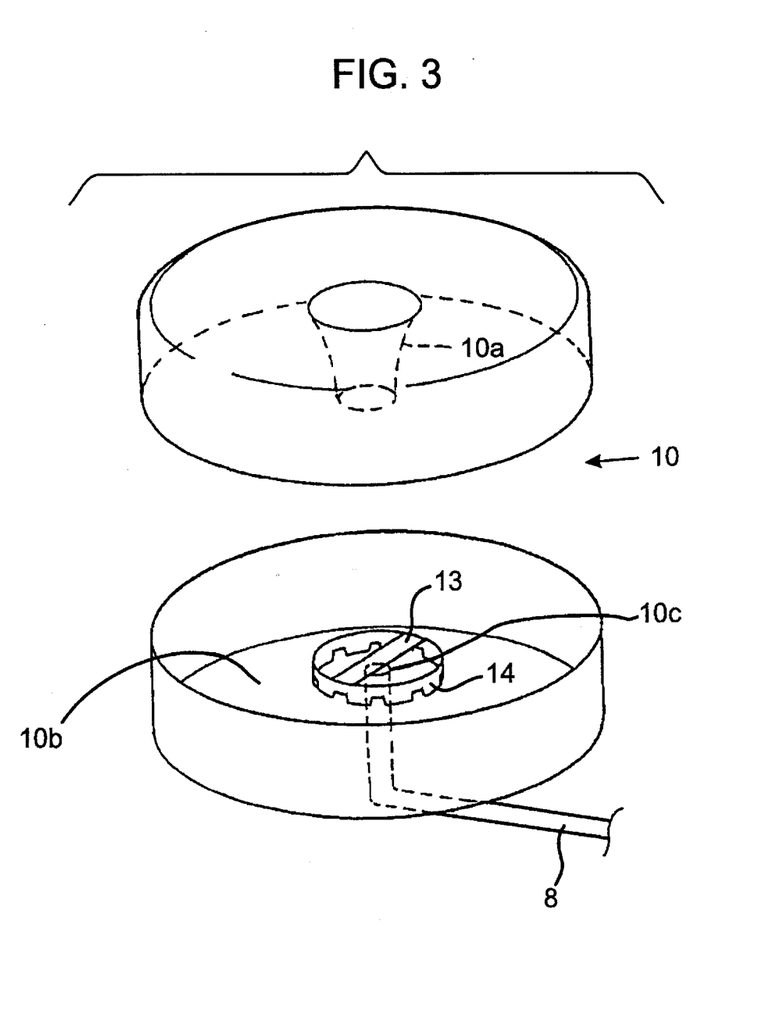
FIG. 3 shows an exploded view of a reference instrument of the present invention.

Further, as shown in FIG. 3, the present invention comprises a wave-control top plate 13 and a wave-control side plate 14 around an opening 10c of the tube 8 positioned at the bottom 10b of the box 10, so that the liquid 9 flowed out of the opening 10c of the hose 8 caused by the fluctuation is controlled by those two plates 13, 14. The plates 13, 14 are also effective for a pressure sensor 11 which sensitively reacts to the pressure of the fluctuation.

The present invention comprises a micro computer 12 which computes an average value of fluctuation waveform in a certain cycle of output voltage of the pressure sensor 11. Therefore, it is not necessary to wait long until the fluctuation of the liquid in the tube 8 stabilizes, so that the pressure sensor 11, which is sensitive to pressure change, can be more useful.

Figure 6:
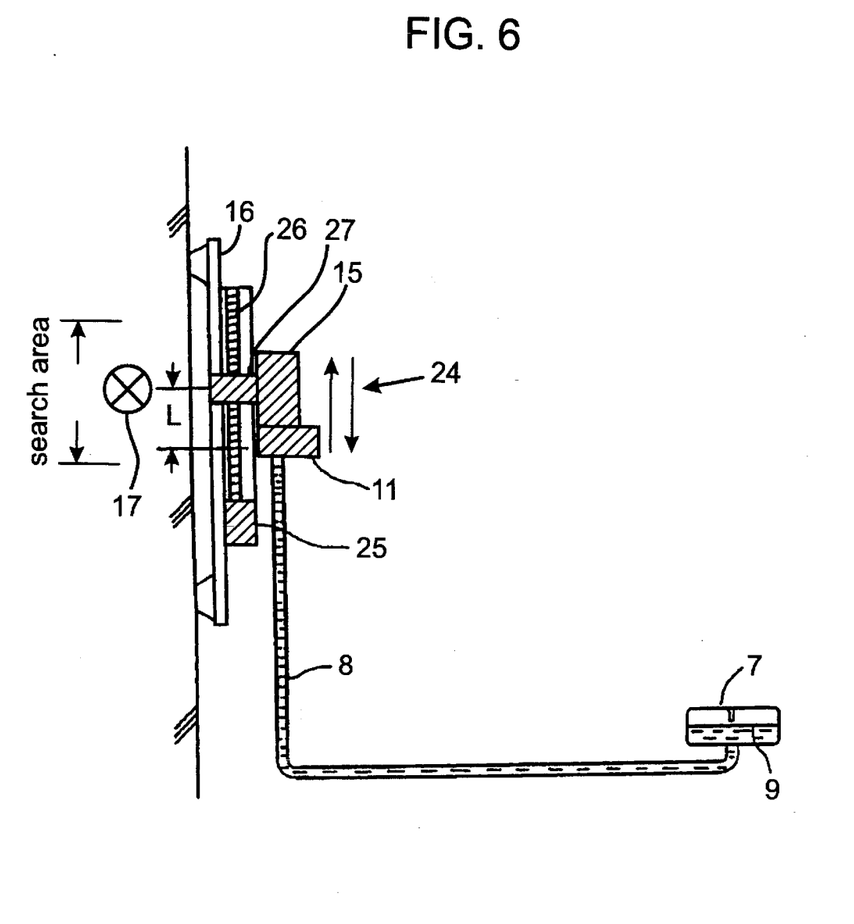
FIG. 6 shows an elevational view of a automatic level marking apparatus according to the present invention.

Level marking should preferably be done automatically by machine rather than human hand for accurate measurement. As shown in FIG. 6, to automatically mark a level, a solenoid-type inker, a cam-type inker or any other marking means 15 such as a jet printer and the like should be comprised, which functions and draws a mark as it receives ON and Off signals dispatched from a pressure sensor 11. It is preferable that the pressure sensor 11 and the inker 15 are unitedly secured to a staff plate 16. The pressure sensor is arranged so that it dispatches ON signal when the marking point of the inker 15 comes to a marking level 17 which is even to the reference level, otherwise it continues to dispatch OFF signal. If, an inker 15 is comprised and there is some distance (L) between the marking point of the inker 15 and the pressure sensor 11, such distance (L) should be compensated by the micro computer 12 in adavance.

By moving a staff plate 16 in the upper and lower directions on the surface of a wall, a level mark is instantly drawn thereon. This enables anyone to conduct level marking operation easily, quickly and accurately by himself without requiring assistants.

A detector 24 is such that a pressure sensor 11 and an inker 15 are secured to a lift 27 which goes up and down as a worm gear 26 revolves generated by a motor 25 which is secured to a staff plate 16. To draw a level mark by this apparatus, the detector 24 is pressed against a surface of a wall where level marking should be drawn, then the pressure sensor 11 is moved up or down by the worm gear 26, then when the pressure sensor comes to a position even to the reference level, a level mark 17 is automatically drawn on the surface of the wall.

As shown in FIG. 6, the search area can be arranged, for example, as wide as about 40 milimeter. When the detector 24 enters in the search area, an OK signal is dispatched based on the pressure caught by the pressure sensor 11. Then, the elevator 27 slowly moves up or down and stops at the marking level. While, the detector 24 is out of the search area, a signal indicating that the detector is below or above the search area is released based on the pressure caught by the pressure sensor 11.

Figure 7:
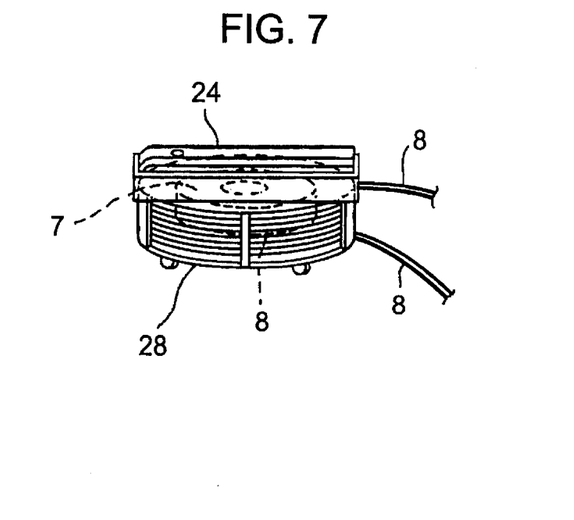
FIG. 7 shows a perspective view of a reference instrument installed in a case according to the present invention.

As shown in FIG. 7, a reference instrument 7, tube 8 and detector 24 may be put in a store case 28, so that it is easier to carry, use and maintain them.

Figure 8:
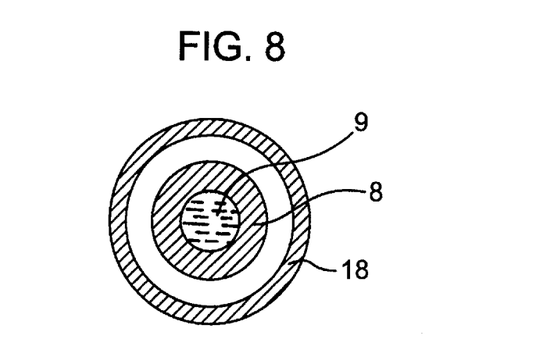
FIG. 8 shows a trasverse sectional view of a combination of a tube and an outer-tube according to the present invention.

Outer factors such as change of temperature and mechanical shock arise fluctuation of the liquid 9 in a tube 8. To prevent this, as shown in FIG. 8, an outer tube 18 may be secured around an inner tube 8.

It is better that both tubes 8, 18 separate each other at many portions. According to an experimental test, the outer tube 18 is remarkably effective.

The present invention, as described above, has such effects that it makes possible that an individual can do level marking operation easily, quickly and accurately by himself without assistants.

We claim:

1. A method for measuring a level position and directly measuring a height, comprising:

air-tightly securing a pressure sensor to one end of an elastic resin tube and connecting a reference instrument to the other end of said tube, said reference instrument having a larger diameter and being shorter in length than said tube;

totally filling said tube with low viscosity macromolecule liquid;

connecting said pressure sensor to a micro computer programmed to find an average value of fluctuation waveform within a certain cycle of output voltage of said pressure sensor, said micro computer including means to calculate and memorize a reference level based on a pressure difference between said reference instrument and said pressure sensor when placed at different heights;

finding a level position to said reference level by said pressure sensor, said pressure sensor capable of indicating zero at a position level to said reference level, positive pressure when said pressure sensor at a position lower than said reference level, and negative pressure at a position higher than said reference level.

2. The method of claim 1 including:

connecting a marking means to the pressure sensor;

securing said marking means and said pressure sensor to a lift, capable of moving up and down along a staff plate;

actuating said marking means by an ON signal from said pressure sensor;

automatically dispatching said ON signal when said marking means is at the same height as said reference level.

3. A level marking apparatus capable of directly measuring a height, comprising:

an elastic synthetic resin tube, one end of said tube secured to a pressure sensor capable of producing an output voltage and air-tightly sealed, the other end of said tube connected to a reference instrument;

said reference instrument having a larger diameter and being shorter in length than said tube;

said tube being totally filled with low viscosity macromolecule liquid;

said pressure sensor being connected to a micro computer programmed to find an average value of fluctuation waveform within a certain cycle of output voltage of said pressure sensor, said micro computer including means to calculate and memorize a reference level based on a pressure difference between said reference instrument and said pressure sensor where placed at different heights;

a marking means connected to said pressure sensor, said marking means being actuated by an ON signal from said pressure sensor, said ON signal being dispatched when said marking means is at the same height as said reference level;

said marking means and said pressure sensor being secured to a lift, capable of moving up and down along a staff plate;

whereby said marking means automatically indicates a level mark when a level is reached equal to said reference level.

4. A level marking apparatus capable of directly measuring a height, according to claim 3, further comprising wave-control top and side plates secured to an opening of said tube in said reference instrument, said top and side plates being capable of ceasing fluctuation energy.

5. A level marking apparatus capable of directly measuring a height, according to claim 3, further comprising an outer tube surrounding an inner tube to protect said inner tube from an outer cause.

* * * * *